United States Patent
Na et al.

(10) Patent No.: US 7,092,925 B2
(45) Date of Patent: Aug. 15, 2006

(54) INTELLIGENT PORTABLE COMMUNICATIONS DEVICE AND OPERATION METHOD FOR THE SAME ACCORDING TO USER'S SCHEDULE

(75) Inventors: Chung-seob Na, Suwon-si (KR); Ji-hyun Kim, Seoul (KR); Berm-jin Cho, Seongnam-si (KR); Jin-lang Kim, Seoul (KR); Min-gyun Jeong, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 720 days.

(21) Appl. No.: 09/968,774

(22) Filed: Oct. 3, 2001

(65) Prior Publication Data

US 2002/0083028 A1    Jun. 27, 2002

(30) Foreign Application Priority Data

Dec. 27, 2000    (KR) .............................. 2000-82755

(51) Int. Cl.
*G06F 17/00* (2006.01)
*G06N 5/02* (2006.01)

(52) U.S. Cl. .............................. 706/46; 706/14; 706/12

(58) Field of Classification Search ................ 706/46, 706/14, 12; 340/825.44
See application file for complete search history.

(56) References Cited

U.S. PATENT DOCUMENTS 5,973,612 A * 10/1999 Deo et al. .................. 340/7.58
6,052,563 A *  4/2000 Macko ....................... 340/7.1
6,374,277 B1 *  4/2002 Vong et al. ................. 708/112

FOREIGN PATENT DOCUMENTS

| EP | 0 399 520 A2 | 11/1990 |
|---|---|---|
| EP | 0 930 592 A2 | 7/1999 |
| EP | 0 991 249 A1 | 4/2000 |
| JP | 1-248858 A | 10/1989 |
| JP | 5-74056 U | 10/1993 |
| JP | 11-98224 A | 4/1999 |
| JP | 11-252220 A | 9/1999 |
| JP | 2000-295342 A | 10/2000 |
| WO | WO 99/21101 A1 | 4/1999 |
| WO | WO99/30298 * | 6/1999 |
| WO | WO 99/30298 A1 | 6/1999 |
| WO | WO 99/39490 A1 | 8/1999 |
| WO | WO 01/35687 A1 | 5/2001 |

* cited by examiner

*Primary Examiner*—Joseph P. Hirl
(74) *Attorney, Agent, or Firm*—Sughrue Mion, PLLC

(57) ABSTRACT

An intelligent portable communications device and its operation method according to a user's schedule are provided. The operation method is formed of the steps of recording the schedule, continuously determining if it is necessary to alert the user, determining if the user has a scheduled event if alerting the user is necessary, determining if the user can be called during a scheduled event, automatically performing a response corresponding to the recorded schedule for the call if the user cannot be alerted, and alerting the user if the user can be alerted, or if the user does not have the scheduled event. Therefore, even though the user has not manipulated the portable communications device before a scheduled event, the user is not disturbed, a noise interruption can be prevented, and the caller can be led to conform to the user's schedule through the automatic response function.

13 Claims, 8 Drawing Sheets

INTELLIGENT PORTABLE COMMUNICATIONS DEVICE AND OPERATION METHOD FOR THE SAME ACCORDING TO USER'S SCHEDULE

BACKGROUND OF THE INVENTION

1. Field of the Invention

The present invention relates to a portable communications device, such as a cellular phone, and more particularly, to an intelligent portable communications device and an operation method for the same according to a user's schedule. The present application is based on Korean Patent Application No. 2000-82755 filed on Dec. 27, 2001, which is incorporated herein by reference.

2. Description of the Related Art

The operation method of a conventional portable communications device will now be explained with reference to an attached drawing.

FIG. 1 is a flowchart explaining the operation method of a conventional portable communications device. The operation method is formed of steps 10–18 for alerting a user according to preset user conditions.

Referring to FIG. 1, a conventional portable communications device determines whether or not it is necessary to alert a user in step 10. If alerting the user is necessary, the device determines how to alert the user in step 12. Here, if an outside caller calls the user or an alarm is desired, it is considered necessary to alert the user.

If it is desired to alert the user by sound, the user is alerted by a sound such as a ring in step 14. If it is desired to alert the user by vibration instead of sound, the user is alerted by a vibration in step 16. Likewise, if it is desired to alert the user by lamp, the user is alerted by a light in step 18.

In steps 14 through 18 of the operation method of a conventional portable communications device shown in FIG. 1, the user is called by using a mode preset by the user. Specifically, the user is alerted by the calling mode preset by the user regardless of whether the user is in a conference or absent, that is, regardless of the user's schedule. Therefore, the user has to laboriously manipulate the portable communications device when he has a scheduled event so that the scheduled event is not disturbed. If the user does not prevent a portable communications device from alerting the user using sound prior to a scheduled event, an incoming call during the scheduled event can cause a disruption.

SUMMARY OF THE INVENTION

To solve the above problems, it is an object of the present invention to provide an operation method according to a user's prerecorded schedule of an intelligent portable communications device which can intelligently process a call to a user who is participating in a scheduled event according to the user's prerecorded schedule.

It is another object to provide the intelligent portable communications device which performs the operation method according to the user's schedule.

To accomplish the above object of the present invention, there is provided an operation method of an intelligent portable communications device according to a user's schedule, the operation method having the steps of (a) recording the schedule; (b) continuously determining if it is necessary to alert the user; (c) determining if the user has a scheduled event if it is determined that alerting the user is necessary; (d) determining if the user can be alerted if it is determined that the user has the scheduled event; (e) automatically performing a response corresponding to the recorded schedule for a call if it is determined that the user cannot be alerted; and (f) calling the user if it is determined that the user can be alerted, or if the user does not have the scheduled event.

To accomplish another object of the present invention, there is also provided an intelligent portable communications device performing an operation method according to a user's schedule, the intelligent portable communications device having a storage unit for externally receiving and storing the schedule; a signal generating unit for generating a call input signal for calling the user; an automatic response unit for generating a response message corresponding to the response to the call, from response data, and outputting the generated response message; a calling unit for outputting a call output signal in the format determined from call data, to the user; and a main controller for analyzing the schedule read from the storage unit in response to the call input signal, and outputting the response data and call data extracted from the schedule in response to the analyzed result, to the automatic response unit and the calling unit, respectively.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1:
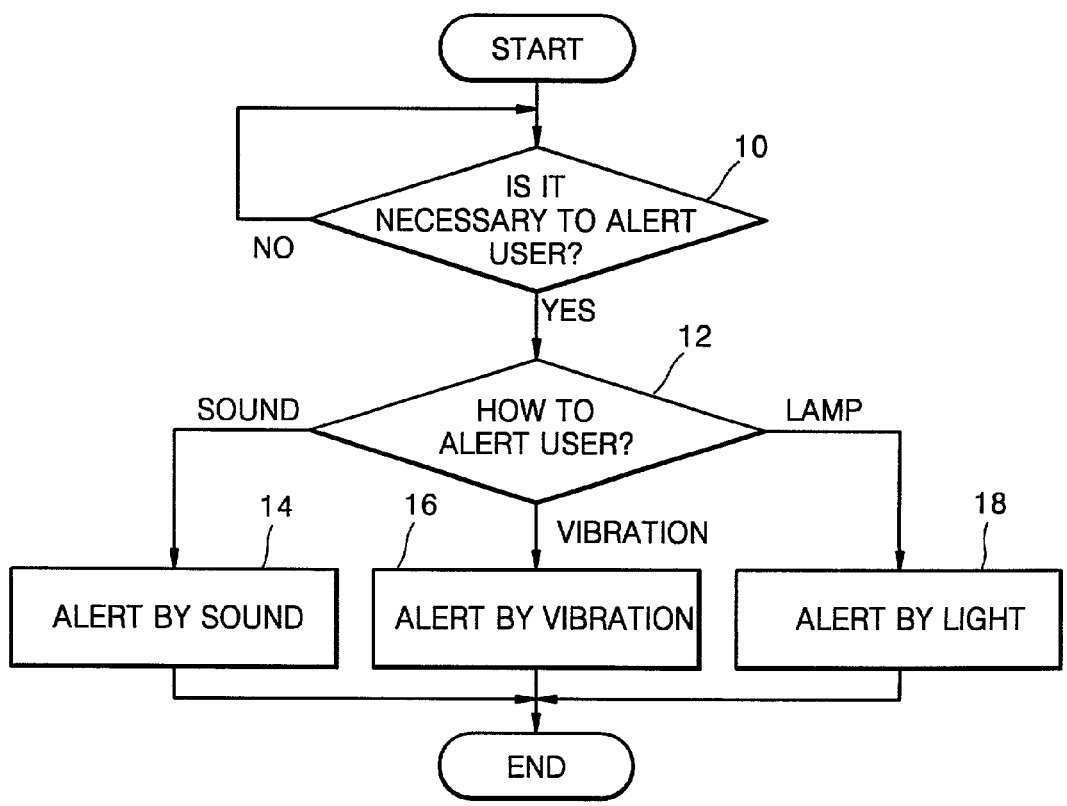
FIG. 1 is a flowchart explaining the operation method of a conventional portable communications device.
Figure 2:
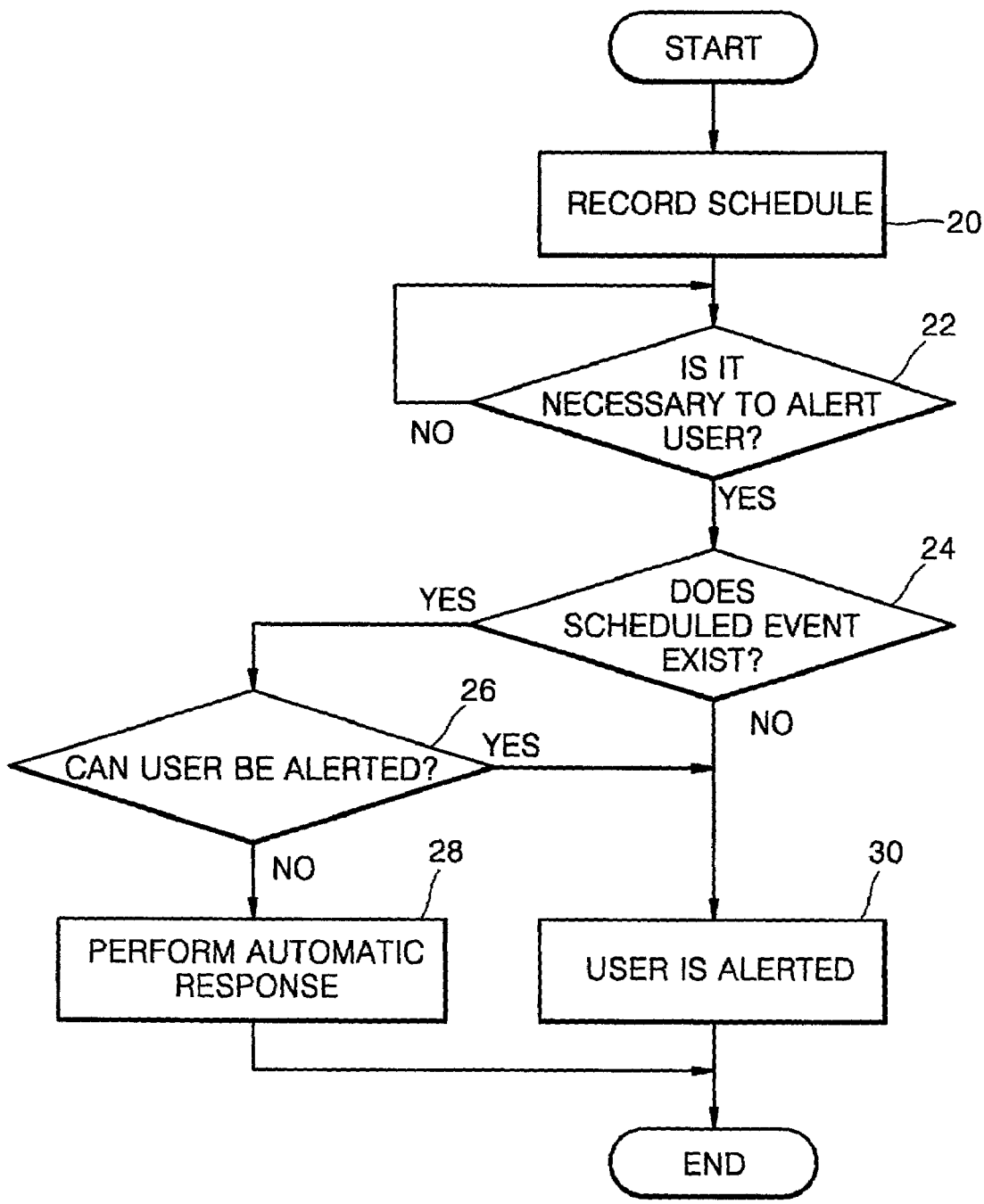
FIG. 2 is a flowchart explaining a first preferred embodiment of an operation method according to a user's schedule in an intelligent portable communications device of the present invention.

FIG. 2 is a flowchart explaining a first preferred embodiment of an operation method according to a user's schedule in an intelligent portable communications device of the present invention. The operation method is formed of steps 20–30 for processing a call according to a prerecorded schedule by itself in the apparatus.

To perform the operation method according to a user's schedule of the present invention, a user's personal schedule of daily, weekly, monthly, or yearly events are entered into the intelligent portable communication device in step 20. The recorded schedule can be updated and can be stored after being categorized into themes. For example, themes of the schedule may include a conference period, an absent period, an appointment period, a public performance period, a religious activity period, a sleep period, a work period, a holiday period, an expected phone call period, a memorial day, a statutory holiday, a mealtime, a journey period, a recreational and sport activity period, etc.

In step 22, the intelligent portable communications device continuously checks whether or not it needs to call the user. A preferred embodiment of step 22 according to the present invention will now be explained.

Figure 3:
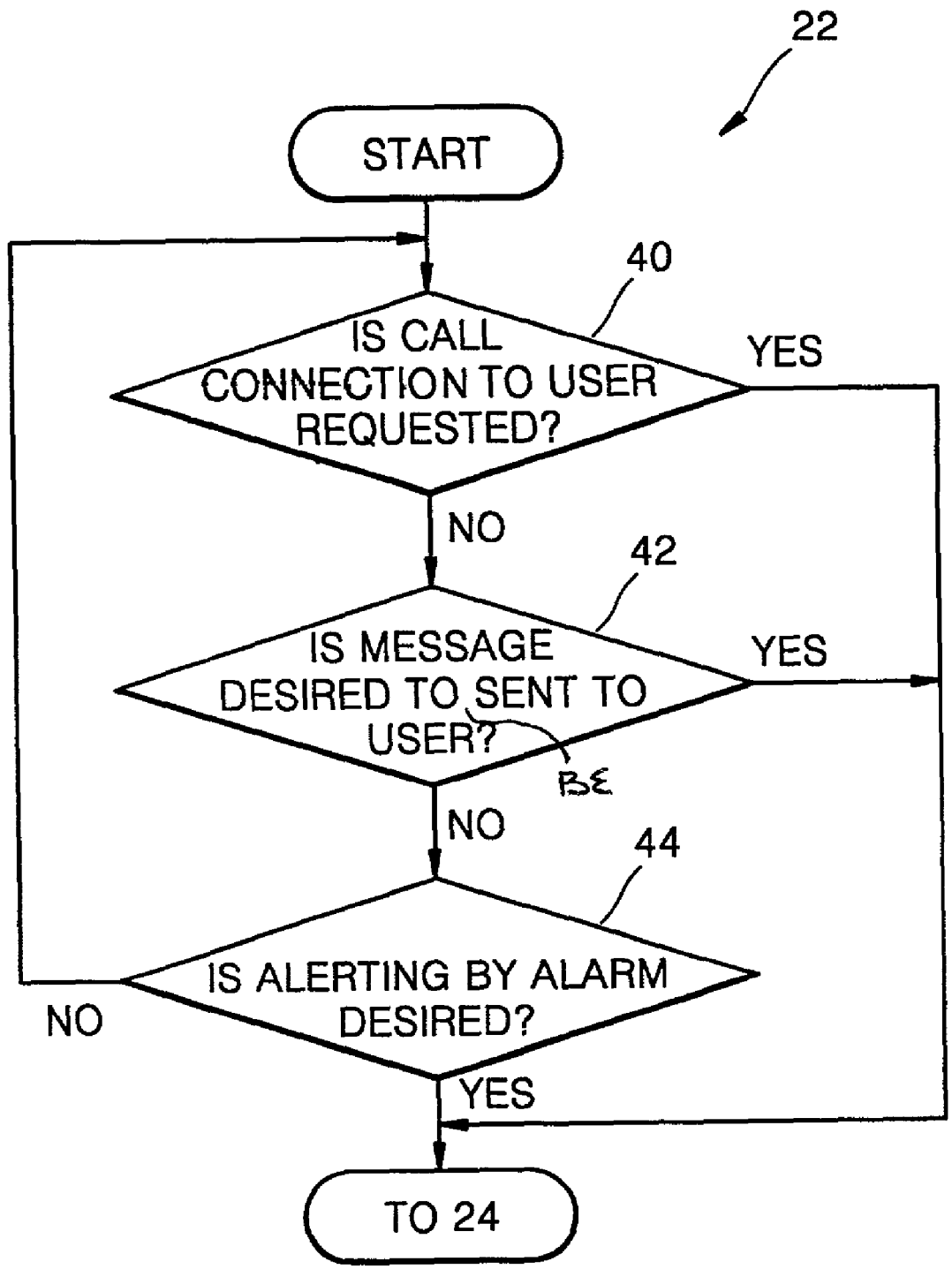
FIG. 3 is a flowchart explaining a preferred embodiment of step 22 shown in FIG. 2 according to the present invention.

FIG. 3 is a flowchart explaining an embodiment of step 22 shown in FIG. 2 according to the present invention. Step 22 is formed of steps 40–44 for calling the user inside or outside the intelligent portable communications device.

In step 40, the intelligent portable communications device determines whether or not an outside caller requests to be connected to the user. If the outside caller requests to be connected to the user, step 24 is performed. If the outside caller does not request to be connected to the user, it is determined whether the outside caller desires to send a message or whether the caller has already sent a message to the user in step 42. If the caller desires to send a message or the caller has already sent a message to the user, step 24 is performed. That is, in steps 40 and 42, it is determined whether a call outside the intelligent portable communications device has been made to the user. However, if an outside call has not been made to the user, it is determined if an internal alarm for informing the user about a specific or predetermined message inside the intelligent portable communications device is desired in step 44. If an internal alarm is desired, step 24 is performed. However, if an internal alarm is not desired, steps 40–44 are repeatedly performed in order to determine whether the user is called. That is, in step 44, a determination of whether the user is called is made by the intelligent portable communications device.

In step 24, if alerting the user is necessary, the intelligent portable communications device checks through the prerecorded schedule if the user has a scheduled event. That is, if alerting the user is necessary, it is determined whether the intelligent portable communications device is presently in a state of schedule management.

If the user has a scheduled event, it is determined by the prerecorded schedule whether or not the user can receive the call in step 26. That is, if it is determined that the user currently is in a prerecorded scheduled event, it is determined by analyzing the recorded schedule whether or not the user can be alerted. At this time, if the user cannot receive the call, a response appropriate to the prerecorded scheduled event is automatically sent in step 28.

Here, an embodiment of step 28 according to the present invention will now be explained.

Figure 4:
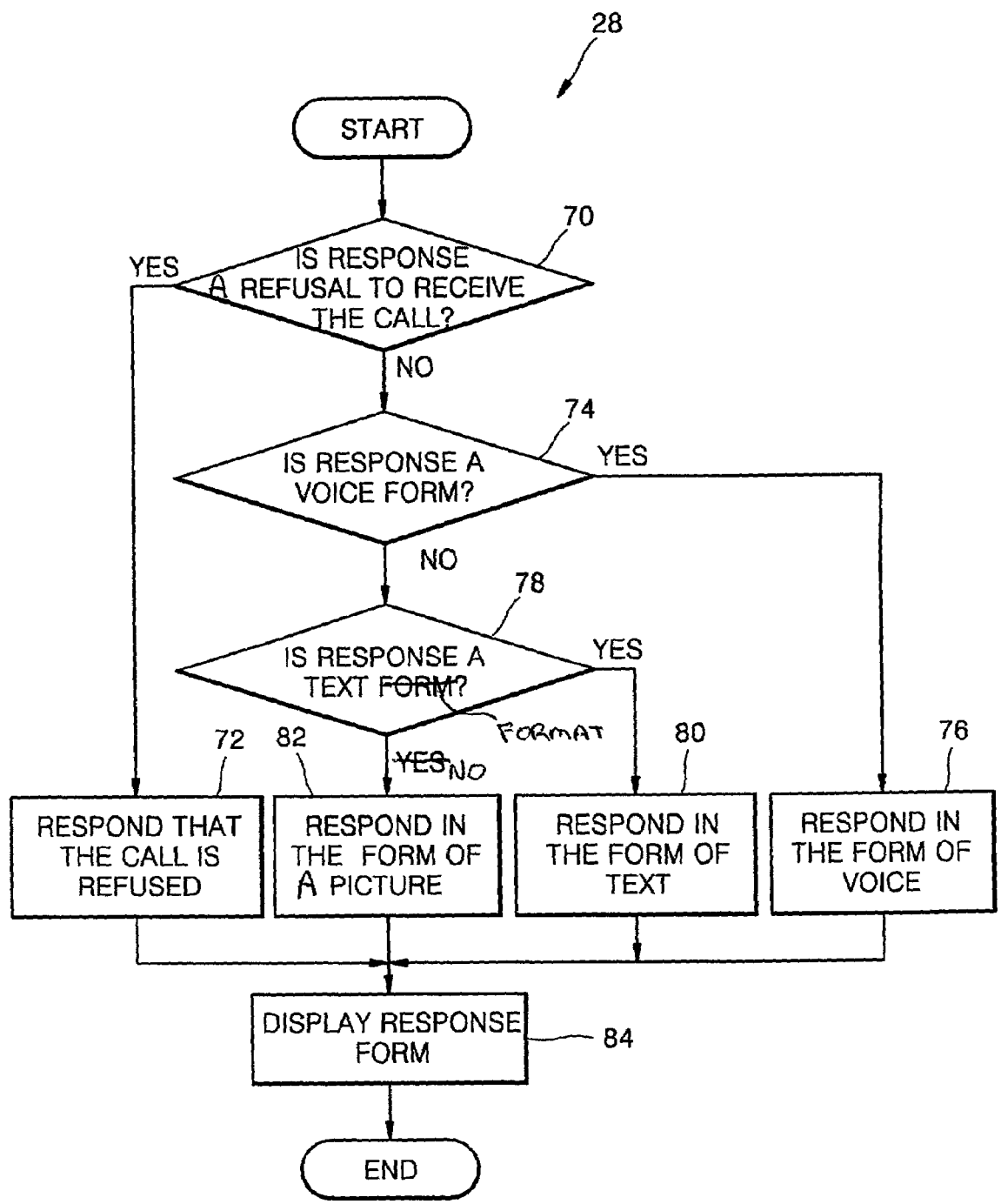
FIG. 4 is a flowchart explaining a preferred embodiment of step 28 shown in FIG. 2 according to the present invention.

FIG. 4 is a flowchart explaining an embodiment of step 28 shown in FIG. 2 according to the present invention. Step 28 is formed of steps 70–82 for automatically responding to an outside caller with a response that is determined by analyzing the prerecorded schedule and step 84 for displaying the response.

It is first determined whether or not the automatic response to the caller should be a refusal to receive the call, by analyzing the prerecorded schedule in step 70. If the automatic response is a refusal to receive the call, an automatic response is given for refusing the receipt of the call in step 72. For example, a message, "At present, the user cannot receive the call," may be automatically responded. If the automatic response is not a refusal to receive the call, it is determined whether or not the automatic response is in a voice format in step 74. If the automatic response is in a voice format, a voice message is automatically responded to the caller in step 76. However, if the automatic response is not in a voice format, it is determined whether or not the automatic response is in a text format in step 78. If the automatic response is in a text format, a text message is automatically sent to the caller in step 80. The text message can be a short message. Here, if the automatic response is not in a text format, an automatic response in the format of a picture is sent to the caller in step 82. The picture may be an animation. Steps 70, 74, and 78 are performed based on the prerecorded schedule, and the automatic response messages in steps 72, 76, 80, and 82 are contained in the prerecorded schedule. According to the first preferred embodiment of the present invention, the automatic response, that is, a call refusal, a voice message, a text message, or a picture, is displayed to the user in step 84.

To aid in understanding step 28, shown in FIGS. 2 and 4, the format and message of the automatic response, which are provided to the user in the scheduled event when the scheduled events of the user are previously recorded, are explained as follows. The first scheduled event is recorded as a team conference period from 2 p.m. to 4 p.m. every Friday with a set automatic response in a text format of a message saying, "It is conference time now. The call can be connected after 4 p.m." The second scheduled event is recorded as a daily sleeping period from midnight to 6 a.m. with a set automatic response in a picture format of an animation indicating sleeping. It is noted in the schedule that the user cannot receive a call during the team conference period or the sleeping period. If the intelligent portable communications device wants to call the user during the team conference period, the automatic response of a text message, "It is conference time now. The call can be connected after 4 p.m." is automatically sent to the caller. If the device wants to call the user during the sleeping period, the automatic response of an animation indicating sleeping is automatically sent to the caller. The automatic response format, the automatic response message, and/or the time when the automatic response is sent are displayed so that the user is made aware of the missed call after the team conference or the sleeping period.

However, if it is determined in step 26 that the user can be alerted, or if it is determined in step 24 that the user has no event scheduled, by analyzing the prerecorded schedule, the user is alerted in step 30.

Here, a preferred embodiment of step 30 according to the present invention will now be explained.

Figure 5:
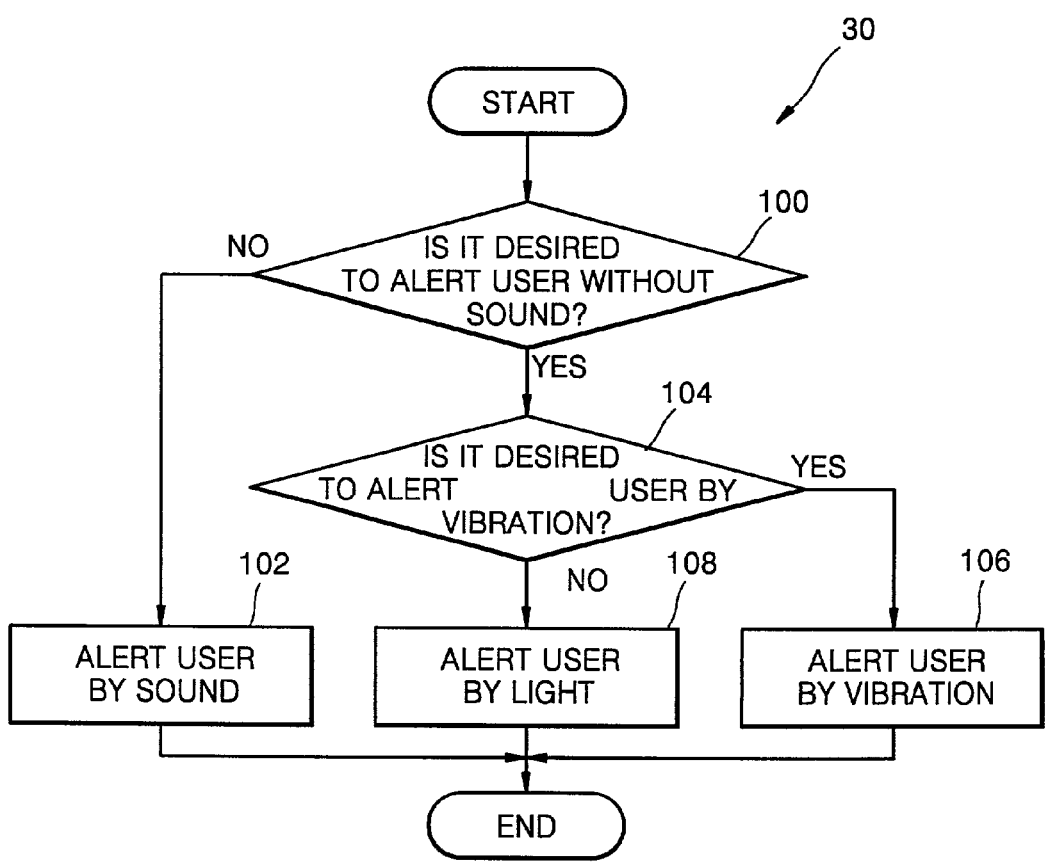
FIG. 5 is a flowchart explaining a preferred embodiment of step 30 shown in FIG. 2 according to the present invention.

FIG. 5 is a flowchart explaining an embodiment of step 30 shown in FIG. 2 according to the present invention. Step 30 is formed of steps 100–108 for alerting the user by a mode according to the prerecorded schedule.

It is first determined by analyzing the prerecorded schedule whether the user is to be alerted without sound in step 100. If the user is to be alerted by sound, the user is called by a sound prescheduled in the prerecorded schedule in step 102. However, if the user is to be alerted without sound, it is determined by analyzing the prerecorded schedule whether or not the caller is to be alerted by vibration in step 104. At this time, if it is determined that the user is to be alerted by vibration, the user is alerted by a vibration having a strength and length as set in the prerecorded schedule in step 106. However, if the user is not to be alerted by vibration, the user is alerted by turning on a lamp with an intensity as set in the prerecorded schedule in step 108. Here, in steps 102, 106, or 108, a message predetermined in the prerecorded schedule may be displayed in the format of a text message or a picture (e.g., an animation) for the user.

To aid in understanding step 30, shown in FIG. 5, the calling modes during a scheduled event will be explained with the following example, assuming the scheduled events are previously recorded as follows. The first scheduled event is a sport time from 6 a.m. to 7 a.m. every morning and the calling mode is a sound. The second event is a work period from 9 a.m. to 12 a.m. on Monday and Friday and the calling mode is vibration. The third event is mealtime from noon to 1 p.m. everyday and the calling mode is light. The fourth event is a movie watching time from 3 p.m. to 6 p.m. every Saturday and the calling mode is vibration. The user has programmed the intelligent portable communications device with the above events and conditions. If the intelligent portable terminal apparatus needs to alert the user during the sport time, the user is alerted by a sound in step 102. If it is necessary to alert the user during the work period or movie watching time, the user is alerted by a vibration in step 106. If it is needed to alert the user during the mealtime, the user is alerted by a light in step 108.

So far, the operation method according to a user's schedule in the intelligent portable communications device of the present invention shown in FIG. 2 is performed regardless of who the caller is. However, another operation method according to a user's schedule in the intelligent portable communications device of the invention, can be performed depending on who the caller is. This second embodiment of the operation method according to a user's schedule in the intelligent portable communications device of the present invention will now be explained.

Figure 6:
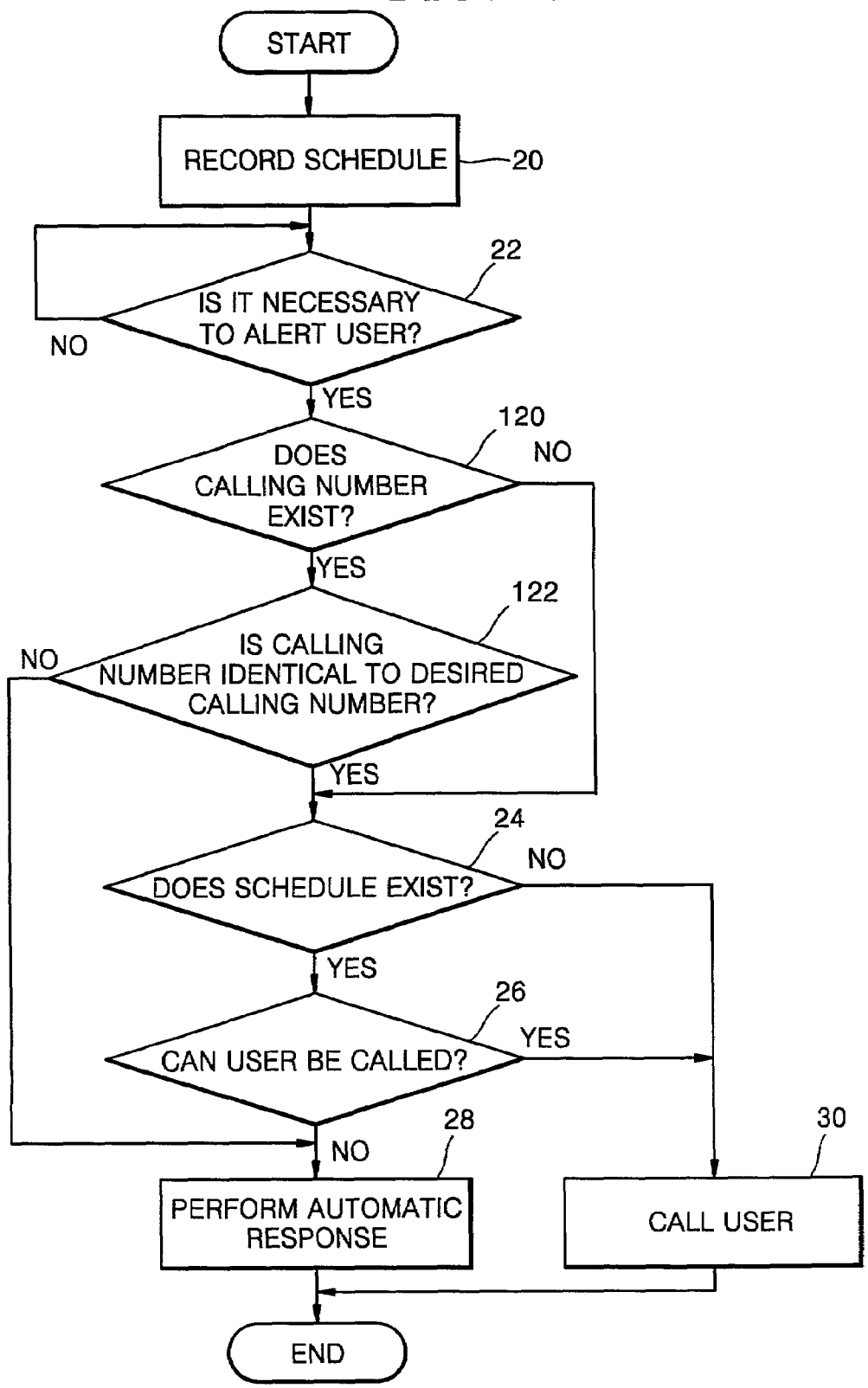
FIG. 6 is a flowchart explaining a second preferred embodiment of an operation method according to a user's schedule in an intelligent portable communications device of the present invention.

FIG. 6 is a flowchart explaining a second preferred embodiment of an operation method according to a user's schedule in an intelligent portable communications device of the present invention. The method is formed of step 20 for previously recording the schedule and steps 22–30, 120, and 122 for processing the call depending on whether or not the caller is a desired caller by analyzing a prerecorded schedule.

The second preferred embodiment of the operation method according to a user's schedule of the present invention shown in FIG. 6 further includes steps 120 and 122 between steps 22 and 24. If steps 120 and 122 are excluded, the second embodiment is the same as the first embodiment shown in FIG. 2. Therefore, explanation of steps 20 through 30, except for steps 120 and 122, will be omitted.

In step 22, if it is determined that alerting the user is necessary, the intelligent portable communications device determines whether or not a calling number from which the user is called exists in step 120. That is, it is determined whether or not the alert is an outside call. If a calling number does not exist, step 24 is performed because if there is no calling number, it is an internal alert by the intelligent portable communications device, and thus, there is no need to select a caller.

However, if a calling number exists, in step 122, it is determined whether the calling number is identical to a desired calling number entered into the prerecorded schedule. Here, the desired calling number means a calling number which has been prerecorded in the schedule because the user desires to receive a call from that calling number even during a scheduled event. If the calling number is not identical to the desired calling number, step 28 is performed so that an automatic response is sent to the caller because the caller is not desired by the user. However, if the calling number is identical to the desired calling number, step 24 is performed so that the user is alerted or an automatic response is sent to the caller according to the prerecorded schedule because the caller is desired by the user.

The structure and operation of a first preferred embodiment of the intelligent portable communications device according to the present invention for performing the operation method according to a user's schedule shown in FIG. 2 will now be explained.

Figure 7:
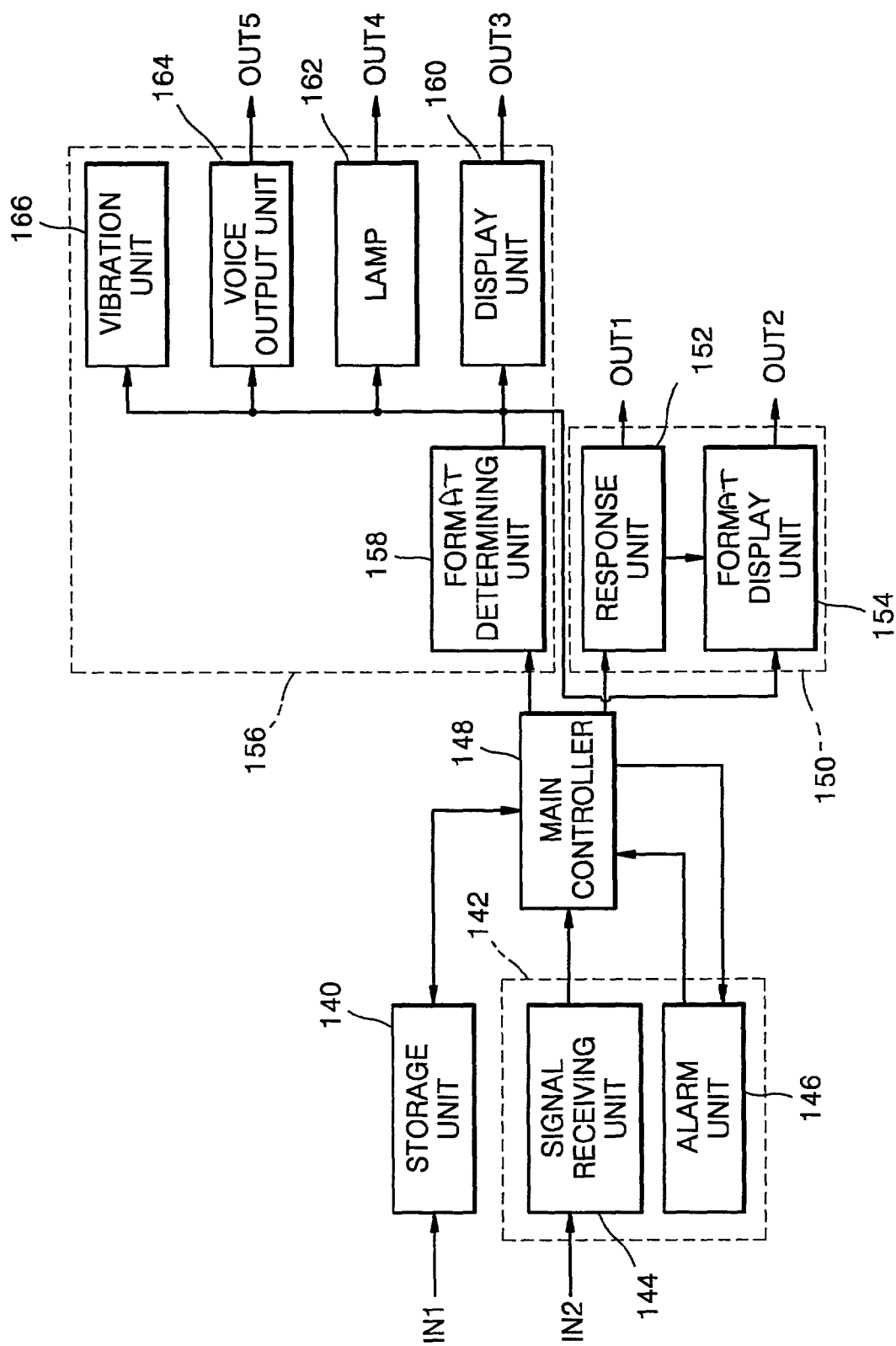
FIG. 7 is a block diagram of a first preferred embodiment of an intelligent portable communications device performing the method shown in FIG. 2 according to the present invention.

FIG. 7 is a block diagram of a first preferred embodiment of an intelligent portable communications device according to the present invention for performing the operation method shown in FIG. 2. The intelligent portable communications device is formed of a storage unit 140, a signal generating unit 142, a main controller 148, an automatic response unit 150, and a calling unit 156.

The storage unit 140 receives and stores a schedule, which is externally provided through an input terminal IN1, and is used to perform step 20.

The signal generating unit 142 generates a call input signal, which indicates that a call to the user is needed, and outputs the call input signal to the main controller 148. The signal generating unit 142 may be formed of a signal receiving unit 144 and an alarm unit 146. The signal receiving unit 144 externally receives a wireless signal through an input terminal IN2 and outputs the received wireless signal to the main controller 148 as the call input signal. The alarm unit 146 outputs an alarm signal to the main controller 148 as the call input at the point of time determined from alarm information input from the main controller 148. Here, the main controller 148 outputs the alarm information read out from the storage unit 140 through the input terminal IN1, to the alarm unit 146.

To perform step 28, the automatic response unit 150 generates an automatic response message for an outside call, based on response data sent from the main controller 148 and provides a generated automatic response message by way of a call refusal format, a picture format, a character format, or a voice format to the caller. For that, the automatic response unit 150 may be formed of a response unit 152 and a format display unit 154. To perform steps 70–82, the response unit 152 determines an automatic response message and format of the message based on the response data input from the main controller 148, sends the automatic response message in the determined format through an output terminal OUT1, and outputs the determined format of the automatic response message to the format display unit 154. Here, the determined format may be a call refusal format, a voice format, a text format, or a picture format. To perform step 84, the format display unit 154 displays the determined format of the automatic response message input from the response unit 152 and/or the calling format input from the calling unit 156 to the user through an output terminal OUT2.

To perform step 30, the calling unit 156 outputs a call output signal to the user in the determined format based on call data input from the main controller 148. For that, the calling unit 156 may be formed of a format determining unit 158, a display unit 160, a lamp 162, a voice output unit 164, and a vibration unit 166. To perform steps 100–104, the format determining unit 158 determines, based on call data input from the main controller 148, the format of a call output signal to be sent to the user and outputs the determined format as a format information signal to each of the display unit 160, the lamp 162, the voice output unit 164, and the format display unit 154. At this time, in response to the format information signal sent from the format determining unit 158, the display unit 160 displays the call output signal in the format of a picture, to the user through an output terminal OUT3. To perform step 108, in response to the format information signal output from the format determining unit 158, the lamp 162 provides the call output signal in the form of light, to the user through an output terminal OUT4. To perform step 102, in response to the format information signal output from the format determining unit 158, the voice output unit 164 provides the call output signal in the form of a sound, to the user through an output terminal OUT5. Similarly, to perform step 106, in response to the format information signal output from the format determining unit 158, the vibration unit 166 provides the call output signal in the form of a vibration to the user.

Meanwhile, in response to a call input signal sent from the signal generating unit 142, the main controller 148 analyzes the schedule stored in the storage unit 140 and outputs response data and call data, both of which are extracted from the schedule in response to the analyzed result, to the automatic response unit 150 and the calling unit 156, respectively. For example, to perform step 22, the main controller 148 determines whether or not the call input signal is sent from the signal generating unit 142. If the call input signal is sent, the main controller 148 analyzes the schedule stored in the storage unit 140 to perform step 24. If the receipt time of the call input signal does not exist in the schedule or the time is included in a schedule having events in which the user can be called, by analyzing the schedule, the main controller 148 extracts call data related to the calling format from the schedule and sends the extracted call data to the calling unit 156. However, if the receipt time of the call input signal is included in a schedule having events in which the user cannot be called, the main controller 148 extracts response data related to the automatic response message and the automatic response format from the schedule and sends the extracted response data to the automatic response unit 150.

The structure and operation of a second preferred embodiment of the intelligent portable communications device according to the present invention for performing the operation method according to a user's schedule shown in FIG. 6 will now be explained.

Figure 8:
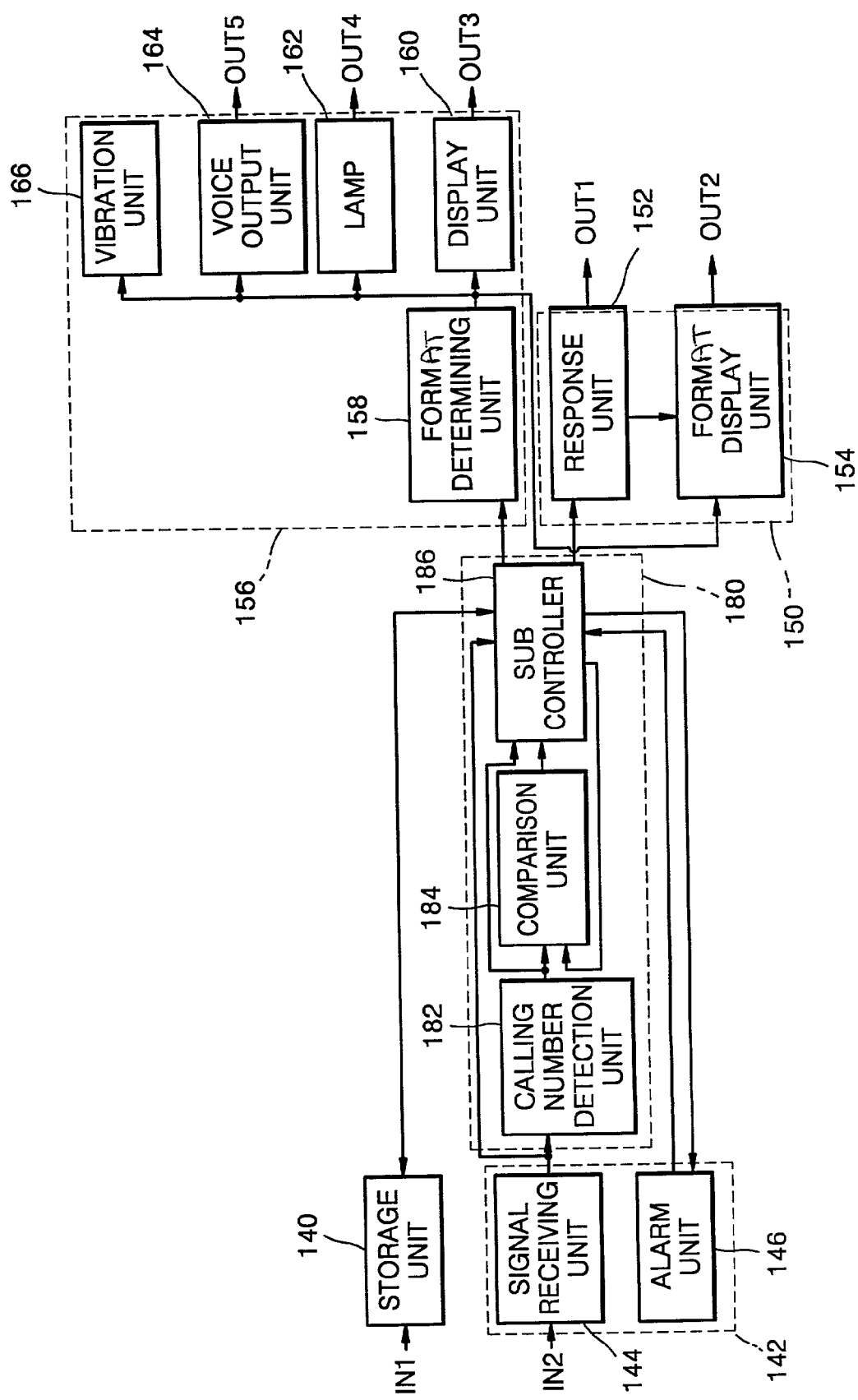
FIG. 8 is a block diagram of a second preferred embodiment of an intelligent portable communications device performing the method shown in FIG. 6 according to the present invention.

FIG. 8 is a block diagram of a second preferred embodiment of an intelligent portable communications device according to the present invention for performing the method shown in FIG. 6. The embodiment is formed of a storage unit 140, a signal generating unit 142, a main controller 180, an automatic response unit 150, and a calling unit 156.

In the intelligent portable communications device shown in FIG. 8, the structure and operation of the main controller 180 is different from the main controller 148 shown in FIG. 7. However, apart from the main controller 180, the intelligent portable communications device shown in FIG. 8 has the same structure and operation as the intelligent portable communications device shown in FIG. 7. That is, the storage unit 140, the signal generating unit 142 formed of the signal receiving unit 144 and the alarm unit 146, the automatic response unit 150 formed of the response unit 152 and the format display unit 154, and the calling unit 156 formed of the format determining unit 158, the display unit 160, the lamp 162, the voice output unit 164, and the vibration unit 166, shown in FIG. 8, correspond to and perform the same functions as the storage unit 140, the signal generating unit 142 formed of the signal receiving unit 144 and the alarm unit 146, the automatic response unit 150 formed of the response unit 152 and the format display unit 154, and the calling unit 156 formed of the format determining unit 158, the display unit 160, the lamp 162, the voice output unit 164, and the vibration unit 166 shown in FIG. 7, respectively, and therefore their explanation will be omitted.

The main controller 180 shown in FIG. 8 is formed of a calling number detection unit 182, a comparison unit 184, and a subcontroller 186. To perform step 120, the calling number detection unit 182 detects the calling number from a wireless signal sent from the signal receiving unit 144 and outputs the detected result to the comparison unit 184.

At this time, if the calling number is not detected from the detected result output by the calling number detection unit 182, the subcontroller 186 does not extract a desired calling number from the schedule stored in the storage unit 140. That is, after step 120 shown in FIG. 6, step 24 is performed. Therefore, the subcontroller 186 performs the same operation as the main controller 148 shown in FIG. 2. That is, in response to the call input signal sent from the signal generating unit 142, the subcontroller 186 analyzes the schedule stored in the storage unit 140, and extracts response and call data from the schedule in response to the analyzed result and then transmits the extracted response and call data to the automatic response unit 150 and the calling unit 156, respectively.

However, if the calling number is detected from the detected result, the subcontroller 186 extracts the desired calling number from the schedule stored in the storage unit 140 and sends the extracted number to the comparison unit 184. That is, after step 120, step 122 is performed. To perform step 122, the comparison unit 184 compares the calling number, which can be included in the detected result output from the calling number detection unit 182, with the desired calling number sent from the subcontroller 186 and then outputs the compared result to the subcontroller 186. At this time, if it is determined, by the compared result input from the comparison unit 184, that the calling number is not identical to the desired calling number, the subcontroller 186 extracts response data from the schedule stored in the storage unit 140 and outputs the extracted data to the automatic response unit 150. However, if it is determined, by the compared result, that the calling number is identical to the desired calling number, the subcontroller 186 analyzes the schedule stored in the storage unit 140, extracts response data and call data from the schedule in response to the analyzed result, and outputs the extracted response and call data to the automatic response unit 150 and the calling unit 156, respectively.

In conclusion, although a user may be called by an outside caller, the subcontroller 186 of the main controller 180 shown in FIG. 8 performs the same operation as the main controller 148 shown in FIG. 7 in a situation where a calling signal is not included in the wireless signal sent through the input terminal IN2 or a call input signal is generated through the alarm unit 146, that is, in a situation where a calling signal is not detected.

As described above, in the intelligent portable communications device and its operation method based on a user's schedule according to the present invention, when the user is called during a scheduled event, the call is intelligently processed according to a schedule prerecorded by the user. Therefore, even though the user has not manipulated the portable communications device before a scheduled event, the user is not disturbed, a noise interruption can be prevented, and the caller can be led to conform to the user's schedule through the automatic response function.

What is claimed is:

1. An operation method of an intelligent portable communications device according to a user's schedule, the operation method comprising the steps of:
    (a) recording the schedule;
    (b) continuously determining if it is necessary to alert the user;
    (c) determining if the user has a scheduled event if it is determined that alerting the user is necessary;
    (d) determining if the user can be alerted if it is determined that the user has the scheduled event;
    (e) automatically performing a response corresponding to the recorded schedule for a call if it is determined that the user cannot be alerted; and
    (f) calling the user if it is determined that it is necessary to alert the user and if it is determined that the user can be alerted, or if the user does not have the scheduled event,
    further comprising steps of:
    determining a calling number from which a call to the user was placed if it is determined that alerting the user is necessary and proceeding to the step (c) if the calling number is not determined; and
    determining if the calling number is identical to a desired calling number if the calling number is determined, and proceeding to the step (e) if the calling number is not identical to the desired calling number, and proceeding to the step (c) if the calling number is identical to the desired calling number, wherein the desired calling number is a number which is recorded in the schedule.

2. The operation method of claim 1, wherein the step (b) comprises the sub-steps of:
    (b1) after the step (a), determining whether a call connection to the user is requested, and proceeding to the step (c) if it is determined that the call connection to the user is requested;
    (b2) determining if a first message is desired to be sent to the user if it is determined that the call connection to the user is not requested, and proceeding to the step (c) if it is determined that the first message is desired to be sent to the user;
    (b3) determining if a predetermined second message is desired to inform the user if it has been determined that the first message is not desired to be sent to the user, and proceeding to the step (c) if it is determined that the predetermined second message is desired to inform the user and proceeding to the step (b1) if it is determined that the predetermined second message is not desired to inform the user.

3. The operation method of claim 1, wherein the step (e) comprises the sub-steps of:
    (e1) determining if the response is a refusal to receive the call;
    (e2) performing the response that the call is refused if the response is the refusal to receive the call;
    (e3) determining if the response is in a voice format if the response is not the refusal to receive the call;
    (e4) responding in the form of voice if the response is in the voice format;
    (e5) determining if the response is a text format if the response is not the voice format; and
    (e6) responding in the form of text if the response is in the text format; and
    (e7) responding in the form of a picture if the response is not in the text format.

4. The operation method of claim 3, wherein the respective determining operations of the steps (e1), (e3), and (e5) are based on the recorded schedule.

5. The operation method of claim 3, wherein the step (e) further comprises a step for displaying a response format to the user after one of the steps (e2), (e4), (e6), and (e7), and the response format is one of a call refusal format, the voice format, the text format, and the picture format.

6. The operation method of claim 1, wherein the step (f) comprises the sub-steps of:
    (f1) determining whether or not the user is alerted without sound based on the recorded schedule;
    (f2) alerting the user without sound if it is determined that the user is to be alerted without sound; and
    (f3) alerting the user by sound if it is determined that the user is to be alerted with sound.

7. The operation method of claim 6, wherein step (f2) comprises the sub-steps of:
    determining if the user is alerted by a vibration if it is determined that the user is to be alerted without sound;
    alerting the user by the vibration if it is determined that the user is to be alerted by vibration; and
    alerting the user with a lamp if it is determined that the user is not to be alerted by vibration.

8. An operation method of an intelligent portable communications device according to a user's schedule, the operation method comprising the steps of:
    (a) recording the schedule;
    (b) continuously determining if it is necessary to alert the user;
    (c) determining if the user has a scheduled event if it is determined that alerting the user is necessary;
    (d) determining if the user can be alerted if it is determined that the user has the scheduled event;
    (e) automatically performing a response corresponding to the recorded schedule for a call if it is determined that the user cannot be alerted; and
    (f) calling the user if it is determined that it is necessary to alert the user and if it is determined that the user can be alerted, or if the user does not have the scheduled event,
    wherein the step (b) comprises the sub-steps of:
    (b1) after the step (a), determining whether a call connection to the user is requested, and proceeding to the step (c) if it is determined that the call connection to the user is requested;
    (b2) determining if a first message is desired to be sent to the user if it is determined that the call connection to the user is not requested, and proceeding to the step (c) if it is determined that the first message is desired to be sent to the user;
    (b3) determining if a predetermined second message is desired to inform the user if it has been determined that the first message is not desired to be sent to the user, and proceeding to the step (c) if it is determined that the predetermined second message is desired to inform the user and proceeding to the step (b1) if it is determined that the predetermined second message is not desired to inform the user.

9. An operation method of an intelligent portable communications device according to a user's schedule, the operation method comprising the steps of:
(a) recording the schedule;
(b) continuously determining if it is necessary to alert the user;
(c) determining if the user has a scheduled event if it is determined that alerting the user is necessary;
(d) determining if the user can be alerted if it is determined that the user has the scheduled event;
(e) automatically performing a response corresponding to the recorded schedule for a call if it is determined that the user cannot be alerted; and
(f) calling the user if it is determined that it is necessary to alert the user and if it is determined that the user can be alerted, or if the user does not have the scheduled event,
wherein the step (e) comprises the sub-steps of:
(e1) determining if the response is a refusal to receive the call;
(e2) performing the response indicating that the call is refused if the response is the refusal to receive the call;
(e3) determining if the response is a voice format if the response is not the refusal to receive the call;
(e4) responding in the form of voice if the response is in the voice format;
(e5) determining if the response is a text format if the response is not the voice format;
(e6) responding in the form of text if the response is in the text format; and
(e7) responding in the form of a picture if the response is not in the text format.

10. The operation method of claim 9, wherein the respective determining operations in the steps (e1), (e3), and (e5) are based on the recorded schedule.

11. The operation method of claim 9, wherein the step (e) further comprises a step for displaying a response format to the user after one of the steps (e2), (e4), (e6), and (e7), and the response format is one of a call refusal format, the voice format, the text format, and the picture format.

12. An operation method of an intelligent portable communications device according to a user's schedule, the operation method comprising the steps of:
(a) recording the schedule;
(b) continuously determining if it is necessary to alert the user;
(c) determining if the user has a scheduled event if it is determined that alerting the user is necessary;
(d) determining if the user can be alerted if it is determined that the user has the scheduled event;
(e) automatically performing a response corresponding to the recorded schedule for a call if it is determined that the user cannot be alerted; and
(f) calling the user if it is determined that it is necessary to alert the user and if it is determined that the user can be alerted, or if the user does not have the scheduled event,
wherein step (f) comprises the sub-steps of:
(f1) determining whether or not the user is alerted without sound, based on the recorded schedule;
(f2) alerting the user without sound if it is determined that the user is to be alerted without sound; and
(f3) alerting the user by sound if it is determined that the user is to be alerted with sound,
wherein step (f2) comprises the sub-steps of:
determining if the user is alerted by a vibration if it is determined that the user is to be alerted without sound;
alerting the user by the vibration if it is determined that the user is to be alerted by vibration; and
alerting the user with a lamp if it is determined that the user is not to be alerted by vibration.

13. An intelligent portable communications device performing an operation method according to a user's schedule, the intelligent portable communications device comprising:
a storage unit for externally receiving and storing the schedule;
a signal generating unit for generating a call input signal for calling the user;
an automatic response unit for generating a response message corresponding to a response to the call, from response data, and outputting the generated response message;
a calling unit for outputting a call output signal in a format determined from call data, to the user; and
a main controller for analyzing the schedule read from the storage unit in response to the call input signal, outputting the response data and the call data, extracted from the schedule in response to the analyzed result, to the automatic response unit and the calling unit, respectively,
wherein the signal generating unit comprises:
a signal receiving unit for receiving an outside wireless signal and outputting the received signal; and
an alarm unit for outputting an alarm signal at a time determined from received alarm information, wherein the main controller outputs the alarm information to the alarm unit, and the wireless signal or the alarm signal is output as the call input signal, and
wherein the main controller comprises:
a calling number detection unit for detecting a calling number from the received signal received from the signal receiving unit, and outputting the detected result;
a comparison unit for comparing the calling number, which can be included in the detected result, with a desired calling number, and outputting the compared result; and
a subcontroller for extracting the desired calling number from the result detected in the calling number detection unit and the schedule read from the storage unit in response to the call input signal, outputting the extracted desired calling number to the comparison unit, analyzing the schedule, and extracting the response data and the call data from the schedule in response to the analyzed result, wherein the desired calling number is a number which is recorded in the schedule.

* * * * *